(12) United States Patent
Lee et al.

(10) Patent No.: US 12,390,975 B2
(45) Date of Patent: Aug. 19, 2025

(54) EXTRUDER

(71) Applicant: LG CHEM, LTD., Seoul (KR)

(72) Inventors: Gyu Il Lee, Daejeon (KR); Byeong Joon Jeong, Daejeon (KR); Woo Seon Choi, Daejeon (KR); Young Hyun Choi, Daejeon (KR); Eung Seob Yeom, Daejeon (KR)

(73) Assignee: LG CHEM, LTD., Seoul (KR)

( * ) Notice: Subject to any disclaimer, the term of this patent is extended or adjusted under 35 U.S.C. 154(b) by 589 days.

(21) Appl. No.: 17/428,205

(22) PCT Filed: Aug. 13, 2020

(86) PCT No.: PCT/KR2020/010746
§ 371 (c)(1),
(2) Date: Aug. 3, 2021

(87) PCT Pub. No.: WO2021/107332
PCT Pub. Date: Jun. 3, 2021

(65) Prior Publication Data
US 2022/0118671 A1 Apr. 21, 2022

(30) Foreign Application Priority Data
Nov. 25, 2019 (KR) .................. 10-2019-0152012

(51) Int. Cl.
B29C 48/00 (2019.01)
B29C 48/36 (2019.01)
(Continued)

(52) U.S. Cl.
CPC .......... B29C 48/397 (2019.02); B29C 48/361 (2019.02); B29C 48/763 (2019.02); B29C 48/767 (2019.02); B29C 48/832 (2019.02)

(58) Field of Classification Search
CPC . B29B 7/429; B29B 9/06; B29C 2948/92895; B29C 48/68; B29C 48/767;
(Continued)

(56) References Cited

U.S. PATENT DOCUMENTS 4,607,797 A * 8/1986 Enikolopow .......... B29B 7/483
241/23
5,728,337 A 3/1998 Yoshikawa et al.
(Continued)

FOREIGN PATENT DOCUMENTS

CN 1172724 A 2/1998
CN 102529062 A 7/2012
(Continued)

OTHER PUBLICATIONS

Ponzielli WO-2017208193-A1 Espacenet English Translation (Year: 2023).*
(Continued)

Primary Examiner — Larry W Thrower

(57) ABSTRACT

An extruder configured to extrude a solid raw material containing moisture includes a barrel, a hopper coupled to one side of the barrel, a discharge port, a screw, vent disposed between the hopper and the discharge port to discharge vapor generated within the barrel; and a heater mounted on the barrel to heat the raw material. Raw material introduced into the barrel through the hopper is heated by the heater while being transferred within the barrel through the screw. A kneading zone, in which raw materials transferred by the screw threads are compressed, is formed on the screw. Since the raw material is melted within the barrel, a heating temperature of the heater and an axial rotation speed of the screw are controlled so that a sealing membrane that shields an inner transverse section of the barrel is formed from the liquid raw material in the kneading zone.

9 Claims, 6 Drawing Sheets

(51) Int. Cl.
  *B29C 48/395* (2019.01)
  *B29C 48/76* (2019.01)
  *B29C 48/80* (2019.01)

(58) Field of Classification Search
  CPC ... B29C 48/832; B29C 48/397; B29C 48/361; B29C 48/763; B29C 48/59
  See application file for complete search history.

(56) References Cited

U.S. PATENT DOCUMENTS

| | | | |
|---|---|---|---|
| 6,220,745 | B1 | 4/2001 | Kobayashi et al. |
| 2003/0211189 | A1* | 11/2003 | Eiva .................. B29C 48/875 425/162 |
| 2004/0209977 | A1 | 10/2004 | Hossan |
| 2007/0122515 | A1 | 5/2007 | Kamite et al. |
| 2012/0070615 | A1 | 3/2012 | Shi et al. |
| 2013/0163369 | A1 | 6/2013 | Yusa et al. |
| 2017/0266846 | A1 | 9/2017 | Oda |
| 2018/0001514 | A1 | 1/2018 | Tojo et al. |
| 2018/0128738 | A1* | 5/2018 | Bosi .................. G01N 21/359 |
| 2018/0355160 | A1 | 12/2018 | Michels et al. |
| 2020/0017612 | A1 | 1/2020 | Choi et al. |

FOREIGN PATENT DOCUMENTS

| | | |
|---|---|---|
| CN | 104004288 A | 8/2014 |
| CN | 103158208 B | 9/2015 |
| CN | 106279553 A | 1/2017 |
| CS | 250997 B1 * | 12/1985 |
| EP | 0581360 A2 | 2/1994 |
| EP | 2298533 A1 | 3/2011 |
| JP | H07-329150 A | 12/1995 |
| JP | H09029814 A | 2/1997 |
| JP | H09117954 A | 5/1997 |
| JP | H10-34730 A | 2/1998 |
| JP | H11-188769 A | 7/1999 |
| JP | 2000318017 A | 11/2000 |
| JP | 3187920 B2 | 7/2001 |
| JP | 2003213009 A | 7/2003 |
| JP | 2004-042460 A | 2/2004 |
| JP | 2006159409 A | 6/2006 |
| JP | 2008302555 A | 12/2008 |
| JP | 2009184303 A * | 8/2009 ......... B29C 47/6025 |
| JP | 2010-194794 A | 9/2010 |
| JP | 5084078 B2 | 11/2012 |
| JP | 2013-119201 A | 6/2013 |
| JP | 3185887 U | 9/2013 |
| JP | 2020-59176 A | 4/2020 |
| KR | 10-1998-0008506 A | 4/1998 |
| KR | 10-1998-0076321 A | 11/1998 |
| KR | 10-0229118 B1 | 11/1999 |
| KR | 10-2005-0074666 A | 7/2005 |
| KR | 102005-0081629 A | 8/2005 |
| KR | 10-0541055 B1 | 1/2006 |
| KR | 10-0568410 B1 | 4/2006 |
| KR | 20120030309 A | 3/2012 |
| KR | 10-1324079 B1 | 10/2013 |
| KR | 10-1542834 B1 | 8/2015 |
| KR | 20160106878 A | 9/2016 |
| KR | 10-2017-0113993 A | 10/2017 |
| KR | 10-2018-0032759 A | 4/2018 |
| KR | 10-2018-0076645 A | 7/2018 |
| KR | 10-1873209 B1 | 7/2018 |
| KR | 10-2018-0090845 A | 8/2018 |
| KR | 10-1913907 B1 | 10/2018 |
| WO | WO2012108245 A1 | 8/2012 |
| WO | WO2016114305 A1 | 7/2016 |
| WO | WO2017179584 A1 | 10/2017 |
| WO | WO-2017208193 A1 * | 12/2017 ........... B29C 48/251 |

OTHER PUBLICATIONS

Ishibashi JP-2009184303-A Espacenet English Translation (Year: 2023).*

Pospisil CS-250997-B1 PE2E English Translation (Year: 2023).*

Wang Jue et al., "Practical Technology and Application of Plastic Modification", Printing Industry Press, first edition, p. 134, Jun. 2014.

Extended European Search Report for related Application EP 20892275.7, mailed Feb. 18, 2022.

Extended European Search Report for related Application EP 20893821.7, mailed Feb. 10, 2022.

Office Action dated Sep. 13, 2023 for U.S. Appl. No. 17/428,602.

* cited by examiner

EXTRUDER

CROSS-REFERENCE TO RELATED APPLICATION

The present application is a National Phase of International Application No. PCT/KR2020/010746 filed on Aug. 13, 2020, which claims the benefit of the priority of Korean Patent Application No. 10-2019-0152012, filed on Nov. 25, 2019, which are hereby incorporated by reference in their entirety.

TECHNICAL FIELD

The present invention relates to an extruder that extrudes a solid raw material containing moisture and, more specifically, to an extruder having a zone in which a sealing membrane is formed from the raw material within a barrel to prevent backflow of moisture discharged from the raw material.

BACKGROUND ART

In a process of manufacturing thermoplastic resin produced by emulsion polymerization, the manufactured thermoplastic resin is generally obtained in a latex state with a dispersion medium. Thus, raw materials contain a large amount of moisture.

Accordingly, the process of manufacturing a thermoplastic resin comprises a dehydration and drying process for removing the moisture.

As the known drying process, a method has been generally performed in which the moisture is evaporated by applying thermal energy to the dehydrated raw material while the raw material is moving or when stopped.

Subsequently, an extruder illustrated in FIG. 1 is used, as needed, to heat and press the dried raw material, and thus, the dried raw material is obtained in a form of pellets.

Referring to FIG. 1 that illustrates the internal configuration of an extruder according to the related art, the extruder is configured such that a hopper 2, through which a raw material is put, is installed on one side of a tubular barrel 1, and the raw material is discharged to a discharge port (a left outlet in the drawing) through an internal screw 5.

The raw material injected through the hopper 2 is heated by a heater (not shown) mounted to the inside or outside of the barrel and pressed by the screw 5. Accordingly, water vapor generated from moisture remaining in the dried raw material is separated while the dried raw material is moved by the screw 5. The separated water vapor is discharged to the outside through a vent part 6 disposed away from the hopper 2.

However, in this structure according to the related art, while the raw material passes through the screw 5, the water vapor generated inside the barrel 1 does not reach the vent part 6 but flows back to the hopper 2. The backflow of the water vapor has a negative effect on smooth input of the raw material, and extrusion performance is deteriorated.

To this end, according to the related art, a check plate 4 for minimizing an effect of the backflow of water vapor and an introduction screw 3 for forcibly injecting the raw material into the barrel are additionally equipped in the hopper 2.

DISCLOSURE OF THE INVENTION

Technical Problem

Thus, the object of the present invention is to provide an extruder capable of directly extruding a raw material that is dehydrated without a drying process and preventing water vapor, which is separated from the raw material, from flowing back to a hopper, thereby improving extrusion efficiency.

Technical Solution

To achieve the above-described object, the present invention provides an extruder configured to extrude a solid raw material containing moisture, the extruder comprising: a barrel having a hollow tubular shape in a longitudinal direction, wherein a hopper into which a raw material is put is coupled to one side of the barrel, and a discharge port through which a dehydrated raw material is discharged is provided on the other side of the barrel; a rod-shaped screw provided with screw threads on an outer circumferential surface thereof so that the screw is mounted within the barrel to transfer a raw material put into the hopper to the discharge port while axially rotating in one direction; a vent part disposed at one point between the hopper and the discharge port to discharge vapor generated within the barrel to the outside; and a heater part mounted on the barrel to heat the raw material, wherein the raw material introduced into the barrel through the hopper is gradually heated by the heater part while being transferred within the barrel through the screw, a kneading zone, in which raw materials transferred by the screw threads are compressed, is formed on the screw, and since the raw material is melted within the barrel so that at least a portion of the raw material is phase-changed into a liquid state, a heating temperature of the heater part and an axial rotation speed of the screw are controlled so that a sealing membrane that shields an inner transverse section of the barrel is formed from the phase-changed raw material (in a liquid state or in a state in which solid and liquid are mixed) in the kneading zone.

The kneading zone is disposed between the vent part and the hopper.

A distance between the kneading zone and the vent part is less than three times a diameter of the barrel. Also, a distance between the kneading zone and the hopper is greater than five times a diameter of the barrel.

The screw comprises: a first forward zone in which the screw threads are provided to transfer the raw material, which is put from the hopper, toward the discharge port when rotating axially; the kneading zone in which the screw threads are provided to compress the raw material, which is transferred from the first forward zone, when rotating axially; and a second forward zone in which the screw threads are provided to transfer the raw material, which passes through the kneading zone, toward the discharge port when rotating axially.

The kneading zone may comprise a neutral zone in which the screw threads are provided on the outer circumferential surface of the rod shape to induce the raw material to rotate at the same place. Also, the kneading zone may comprise a reverse zone in which the screw threads are provided on the outer circumferential surface of the rod shape to transfer the raw material in a direction opposite to the direction in which the raw material is transferred by the screw threads provided in the first forward zone. Also, the kneading zone may be constituted by connecting the neutral zone, in which the screw threads are provided on the outer circumferential surface of the rod shape to induce the raw material to rotate at the same place, to the reverse zone, in which the screw threads are provided on the outer circumferential surface of the rod shape to transfer the raw material in the direction opposite to the direction in which the raw material is transferred by the screw threads provided in the first forward zone, wherein the neutral zone is connected to the first forward zone, and the reverse zone is connected to the second forward zone.

In addition, the screw may further comprise a sub-kneading zone in which the screw threads are provided to recompress the raw material, which is transferred from the second forward zone, when rotating axially.

A distance between the sub-kneading zone and the vent part is greater than three times a diameter of the barrel.

Also, the screw further may comprise a third forward zone in which the screw threads are provided to transfer the raw material, which passes through the sub-kneading zone, toward the discharge port when rotating axially, and a sub-vent part configured to discharge impurities contained in the raw material to the outside may be provided in the barrel within a range in which the third forward zone is formed.

A distance between the sub-kneading zone and the sub-vent part is less than three times a diameter of the barrel.

Also, the extruder may further comprise a pulverizer configured to pulverize the dried raw material that is discharged from the discharge port of the barrel.

Advantageous Effects

In the extruder having the structure described above according to the present invention, the sealing membrane is formed in the kneading zone while the raw material is being extruded inside the barrel, and thus, the backflow of the water vapor to the hopper may be prevented or minimized.

The kneading zone may comprise one of the neutral zone or the reverse zone or the combination thereof and thus may be selectively utilized depending on the state or properties of the raw material.

In addition, the screw according to the present invention may further comprise the sub-kneading zone, and thus, it is possible to form the additional sealing membranes, thereby more efficiently preventing the backflow of the water vapor.

MODE FOR CARRYING OUT THE INVENTION

Hereinafter, the present invention will be described in detail with reference to the accompanying drawings so that the present invention can be easily carried out by a person skill in the art to which the present invention pertains. However, the present invention may be embodied in several different forms, and not be limited to the embodiments set forth herein.

A part unrelated to the description will be omitted so as to clearly describe the present invention, and the same reference symbols are affixed to identical or similar elements throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to an extruder for extruding a solid raw material containing moisture, and hereinafter, the extruder according to the present invention will be described in more detail with reference to the accompanying drawings.

Figure 1:
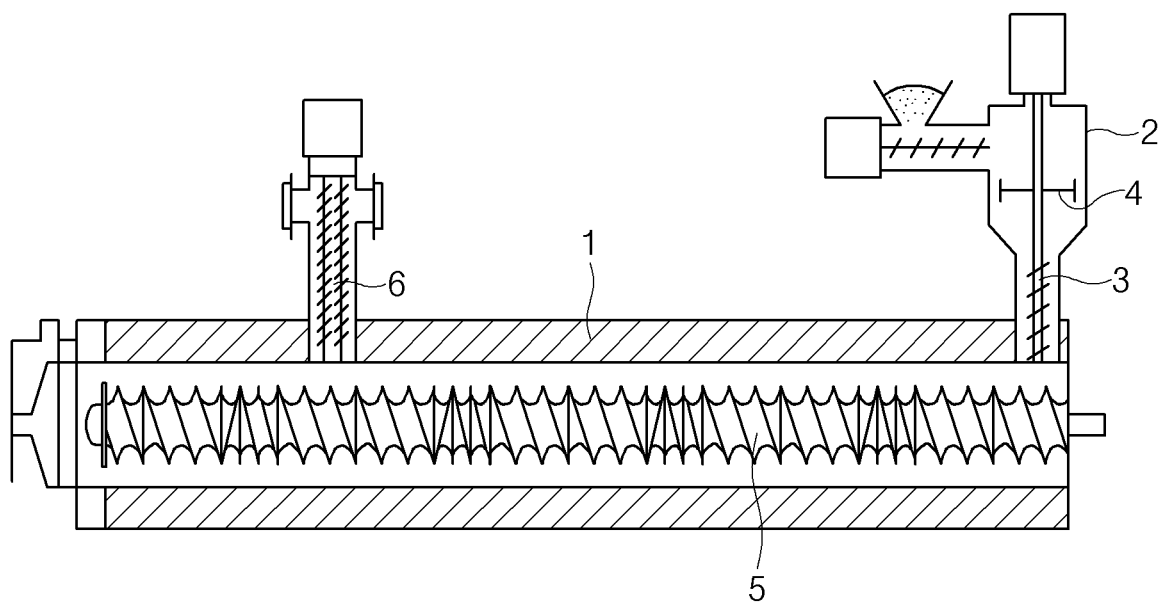
FIG. 1 is a see-through view illustrating the internal configuration of an extruder according to the related art.
Figure 2:
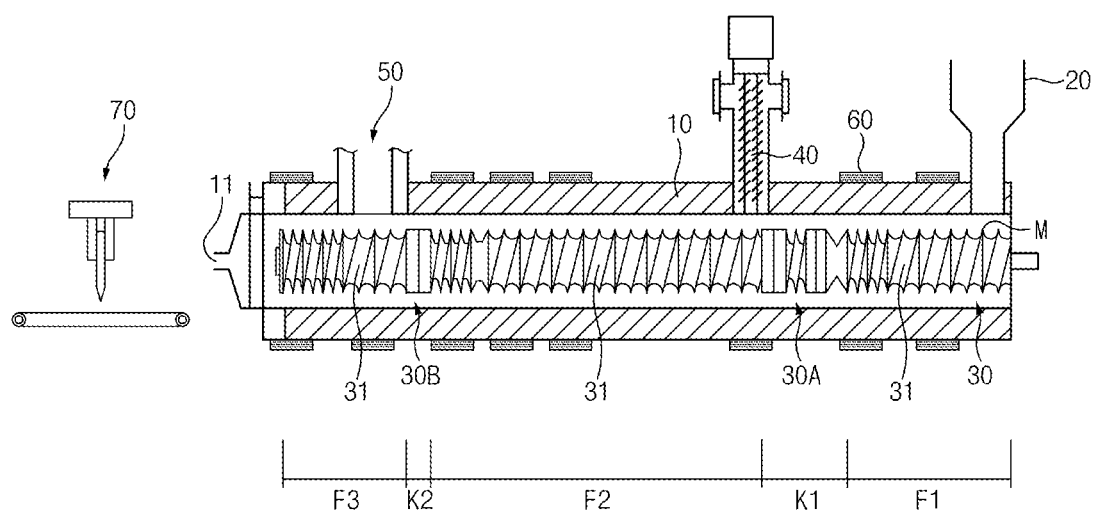
FIG. 2 is a see-through view illustrating the internal configuration of an extruder according to the present invention.

Referring to FIG. 2 illustrating the internal configuration of an extruder according to the present invention, the extruder according to the present invention comprises a barrel 10, a screw 30 mounted inside the barrel 10, a vent part 40 through which water vapor inside the barrel 10 is discharged to the outside, and a heater part 60 for heating the barrel 10. Also, a sealing membrane is formed from a melted resin within the barrel 10.

The barrel 10 has a hollow tubular shape in the longitudinal direction. A hopper 20, through which a raw material is put, is coupled to one side of the barrel 10, and a discharge port 11 for discharging a dehydrated raw material is provided on the other side thereof.

It is desirable that the barrel 10 is made of metal having excellent chemical resistance to prevent corrosion due to volatile substances and water vapor discharged from the raw material, or is manufactured such that the inner surface thereof is coated with a protective material. The barrel 10 is manufactured to have rigidity enough to withstand heat and pressure generated from the inside.

The screw 30 has a bar shape and a structure in which screw threads M (31, 32, 33) are provided on the outer circumferential surface thereof. Also, the screw 20 transfers the raw material, which is put from the hopper 20, toward a discharge port 11 while being mounted inside the barrel 10 and axially rotating in one direction.

Here, the screw threads M having a spiral shape are provided on the outer circumferential surface of the screw 30 in the longitudinal direction. A region, in which the screw threads M are formed in a direction to move the raw material toward the discharge port, is divided into forward zones (sections F1, F2, and F3). Also, a region, in which the screw threads are formed to only rotate the raw material without moving the raw material or to move the raw material in a reverse direction (that is, to move the raw material from the discharge port of the barrel toward the hopper), is defined as a kneading zone 30A.

Figure 3:
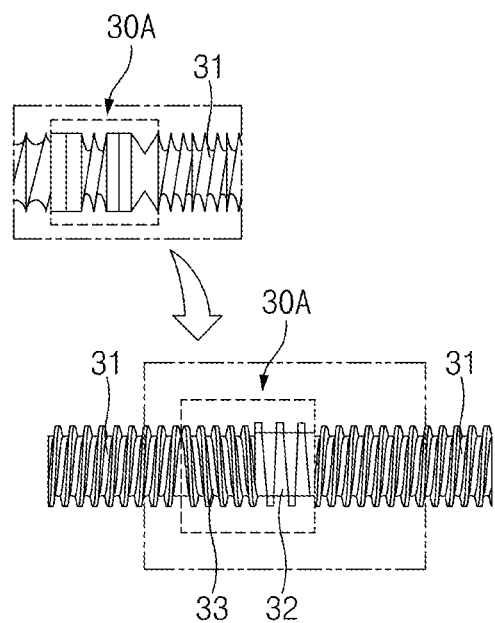
FIG. 3 is an enlarged view of a section in which a kneading zone of FIG. 2 is provided.
Figure 4A:
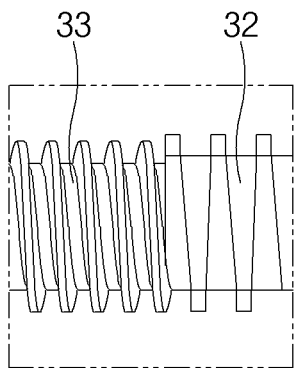
FIG. 4A through 4C are views illustrating embodiments of screw threads applicable to the kneading zone of the present invention.
Figure 4B:
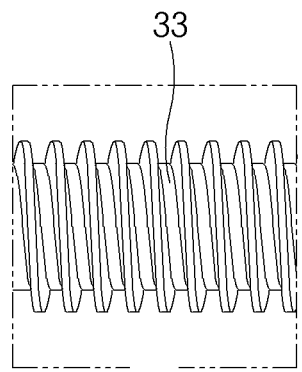
Figure 4C:
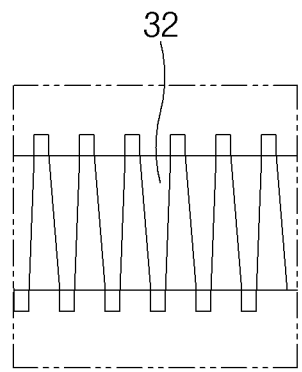

Referring to FIG. 3 illustrating an enlarged view of a section K1 in which the kneading zone 30A of FIG. 2 is provided and FIG. 4A through 4C illustrating shapes of the screw threads applicable to the kneading zone 30A, the screw threads provided in the kneading zone 30A are configured to compress the raw material rather than transfer the raw material. (The upper figure of FIG. 3 is a state in which a case is coupled to the exterior of the screw threads and the lower figure is a state in which the case is removed. Thus, hereinafter, the description will be made with reference to the lower figure.) The kneading zone 30A comprises a neutral zone in which neutral screw threads 32 are provided on the outer circumferential surface of the rod shape to induce the raw material to rotate at the same place and/or a reverse zone in which reverse screw threads 33 are provided on the outer circumferential surface of the rod shape to transfer the raw material in the opposite direction. That is, the present invention provides embodiment 1, 2, and 3 having, respectively, a configuration in which only the neutral zone is provided in the kneading zone, a configuration in which only the reverse zone is provided in the kneading zone, and a configuration in which the neutral zone and the reverse zone are combined.

As illustrated in FIG. 4C, the neutral screw threads 32 provided in the neutral zone may not have a form in which screw threads are connected to each other in a spiral shape, but have an individually separated form (that is, a form in which annular screw threads are connected to each other at intervals). When the raw material reaches the neutral screw threads 32 having the above-described for, force applied to the raw material creates the rotation at the same place rather than transfer.

Also, as illustrated in FIG. 3 and FIG. 4B, the reverse screw threads 33 defined in the reverse zone are provided in a direction opposite to that of the screw threads provided in the forward zone. The reverse screw threads 33 having the above-described form generates force for transferring the raw material in the opposite direction when the raw material reaches.

Alternatively, as illustrated in FIG. 4A, there may be the configuration in which the neutral zone and the reverse zone are combined.

When the raw material reaches the kneading zone 30A in which the neutral zone and/or the reverse zone are provided, the raw material is pressed as agglomerating together with raw material continuously supplied from the forward zone on a rear side.

Here, in the present invention, the screw 30 may have sections F1, F2, and F3 in which a plurality of forward zones are provided and sections K1 and K2 in which a plurality of kneading zones are provided. That is, as illustrated in FIG. 2, there is provided a structure in which a first forward zone (section F1), a kneading zone (section K1), a second forward zone (section F2), a sub-kneading zone (section K2), and a third forward zone (section F3) are arranged in the order from the hopper 20.

Forward screw threads 31 are provided in the first forward zone to transfer the raw material, which is put from the hopper 20, toward the discharge port 11 when rotating axially, and the neutral screw threads 32 or the reverse screw threads 33 are provided in the kneading zone 30A to compress the raw material, which is transferred from the first forward zone, when the screw 30 rotates axially. Also, the neutral screw threads 32 or the reverse screw threads 33 are provided in the sub-kneading zone 30B similar to the kneading zone 30A, and the forward screw threads are provided in the second forward zone and the third forward zone similar to the first forward zone.

In addition, the vent part 40 is mounted to the barrel 10 so that steam (and separated gas, etc.) is discharged after the raw material passes through the kneading zone 30A from the hopper 20. The vent part 40 may have a simple tubular shape that is open upward from the barrel 10, but an openable and closable valve, an exhaust device that forcibly discharges water vapor, and a safety vent that opens only at a certain pressure or higher may be coupled thereto.

Also, the heater part 60 for generating heat is coupled to the outer surface of the barrel 10 (or inside thereof). The heater part 60 may be a device that converts electrical energy into thermal energy or a device that receives a heat source from the outside to heat the barrel.

A plurality of heater parts 60 are mounted over the entirety of the barrel, and temperatures of the heater parts 60 may be individually controlled. Accordingly, the barrel 10 is configured such that a temperature control is possible for each of the sections (the forward zones and the kneading zones).

In the extruder having the above-described structure according to the present invention, when the raw material stored in the hopper 20 is supplied into the barrel 10, the raw material is transferred through the screw 30 inside the barrel 10 and heated (and cooled) to a target temperature by the heater part 60.

Here, when the raw material passes through the first forward zone and reaches the kneading zone 30A, the raw material is pressed in a heated state by raw materials continuously supplied from a rear side and by the rotation force of the screw 30.

Accordingly, the heated and pressed raw material is melt in the kneading zone 30A (or before reaching the kneading zone), and at least a portion or almost all of the raw material is phase-changed into a liquid state.

That is, while being phase-changed from a solid state to a highly viscous liquid state, the raw material, which has been heated and pressed in the kneading zone 30A, is forced to be spread radially due to centrifugal force created in the kneading zone 30A.

Figure 5:
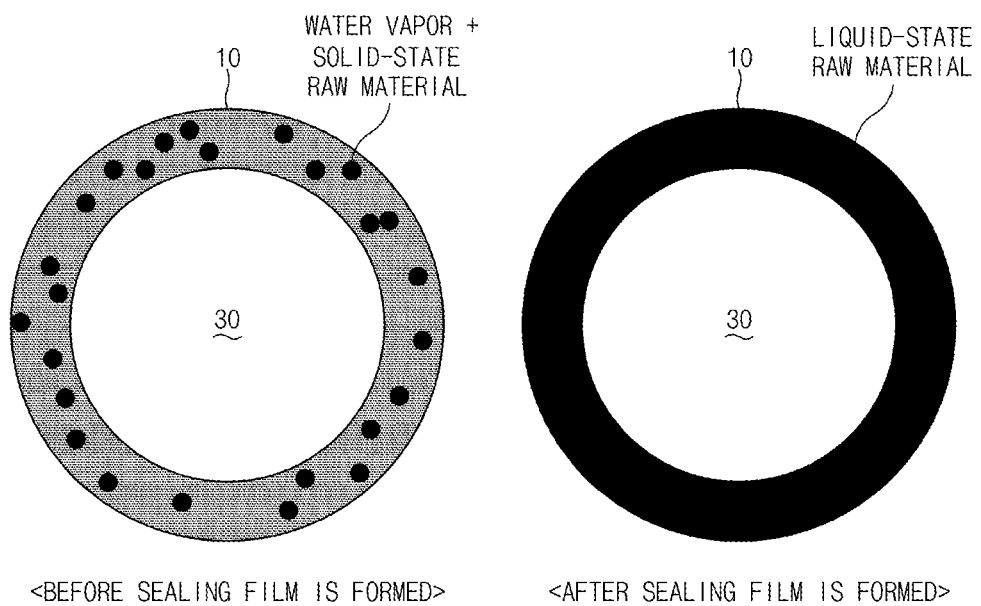
FIG. 5 is a view showing transverse sections before and after a sealing membrane is formed in the kneading zone.

Accordingly, as illustrated in FIG. 5 showing transverse sections before and after a sealing membrane is formed in the kneading zone 30A, a solid raw material, water vapor separated from the raw material, etc. in a front portion of the kneading zone 30A (close to the hopper) are spread into the space between the screw 30 and the barrel 10. Also, as heat and pressure are continuously applied, most of the solid raw material in a rear portion of the kneading zone 30A (close to the discharge port) is melted into a liquid state. Here, a sealing membrane, which shields the transverse section of the barrel 10, is formed from the melted raw material by centrifugal force.

Here, the thickness and the formation position of the sealing membrane may vary depending on the rotation speed of the screw 30, the heating temperature of the heater part 60, and the configuration of the screw threads provided in the kneading zone 30A. Also, in the barrel 10, the sealing membrane is formed in a changeable state rather than in a fixed state.

That is, the sealing membrane is formed as a liquid film, and as a raw material is continuously supplied, the raw material, which has formed the sealing membrane first, passes through the kneading zone 30A and is then discharged toward the second forward zone. Then, a raw material supplied later is changed into a liquid state and maintains the sealing membrane while supplementing the raw material discharged earlier.

Depending on the state and amount of the raw material that is put to consistently maintain the sealing membrane, the heating temperature of the heater part 60 and the axial rotation speed of the screw are controlled.

The liquid raw material and the gas-state water vapor, which have passed through the kneading zone, are transferred to the second forward zone. Here, the liquid raw material is continuously transferred along the screw 30, but the gas-state water vapor (and the gas generated during the phase change) is discharged to the outside through the vent part 40. Here, the backflow of the water vapor to the hopper 20 is prevented by the sealing membrane formed in the kneading zone 30A.

Also, the raw material, which reaches the sub-kneading zone 30B, forms a sealing membrane again in the sub-kneading zone 30B and is then discharged to the discharge port 11 through the third forward zone. While being transferred through the third forward zone, impurities (residual monomers, etc.) contained in the raw material, gas generated during the phase change, surplus water vapor, and the like are discharged to the outside through a sub-vent part 50.

Here, the raw material discharged to the discharge port 11 of the barrel 10 is cooled after the water vapor, gas, and the like are separated therefrom, and then discharged in a form of a solid mass.

The raw material discharged in the form of a solid mass is cut into pellets having a certain size by a pulverizer 70 that pulverizes a dehydrated (dried) raw material.

Also, in the extruder of the present invention, it is desirable that distances between components are limited to improve the drying and dehydration performance.

Figure 6:
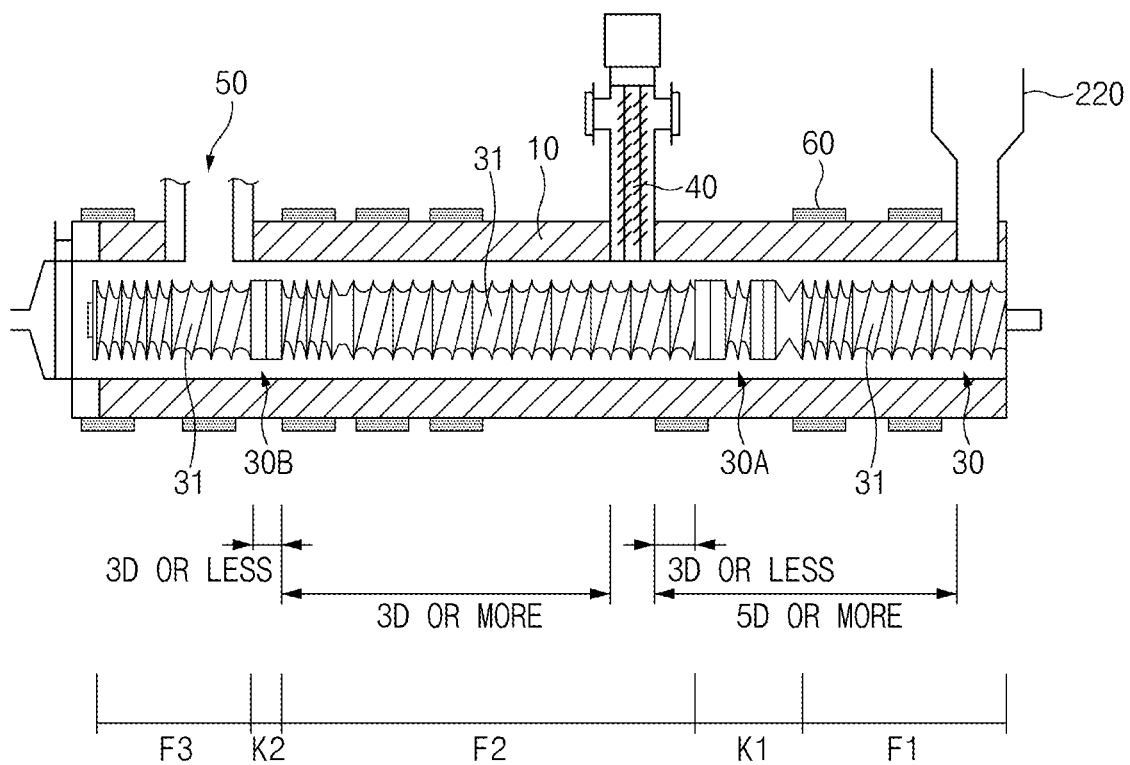
FIG. 6 is a view showing a distance relative to a diameter D of a barrel in the extruder of the present invention.

That is, as illustrated in FIG. 6 showing each distance relative to a diameter D of the barrel in the extruder of the present invention, it is desirable that, on the basis of the diameter D of the barrel 10, a distance from the hopper 20 to the kneading zone 30A is set to 5 D to 10 D. Also, it is desirable that a distance between the kneading zone 30A and the vent part 40 is set to 3D or less, a distance between the vent part 40 and the sub-kneading zone 30B is set to 3D or more, and a distance between the sub-kneading zone 30B and the sub-vent part 50 is set to 3D or less. However, these relative distances are not limited to the ranges described above and may change depending on the length and axial rotation speed of the screw 30, a state of the raw material, an output of the heater part 60, and the like.

In the extruder having the structure described above according to the present invention, the sealing membrane is formed in the kneading zone 30A while the raw material is being dehydrated inside the barrel 10, and thus, the backflow of the water vapor to the hopper 20 may be prevented or minimized.

The kneading zone 30A may comprise one of the neutral zone or the reverse zone, or a combination thereof and thus may be selectively utilized depending on the state or properties of the raw material.

Also, in the present invention, since the screw 30 may further comprise the sub-kneading zone 30B, an additional sealing membrane may be formed. Thus, the water vapor may be discharged through the vent part 40 as much as possible while more efficiently preventing the backflow of water vapor.

Also, in the extruder of the present invention, since the moisture contained in the raw material is discharged through the vent part 40 simultaneously with the extrusion, it is possible to discharge impurities (residual monomers, etc.) contained in the raw material through the sub-vent part 50 as much as possible.

Here, the extruder of the present invention may be an apparatus for extruding thermoplastic resin. This thermoplastic resin may be thermoplastic resin that may be palletized through the extruder and, as a specific example, may be a diene-based graft copolymer. As a more specific example, the diene-based graft copolymer may be an acrylonitrile butadiene styrene graft copolymer.

The diene-based graft copolymer is generally manufactured through an emulsion polymerization method, and is obtained in a latex state in which colloidal particulates of the completely polymerized diene-based graft copolymer are dispersed in water that serves as a dispersion medium, that is, in a solid state containing moisture. Subsequently, the diene-based graft copolymer, which has been obtained in the latex state, is obtained in a form of dry powder through aggregation, dehydration, and dry steps. However, the diene-based graft copolymer obtained in the form of dry powder has a problem that the caking phenomenon occurs due to aggregation and coagulation between the dry powder when stored for a long period of time.

However, the extruder of the present invention may effectively remove the moisture from the solid raw material containing moisture, simultaneously with the extrusion. Thus, in a case where the diene-based graft copolymer is extruded by using the extruder of the present invention, it is not necessary to dry the diene-based graft copolymer obtained in the latex state, and it is possible to directly extrude the dehydrated diene-based graft copolymer.

Also, the diene-based graft copolymer extruded by using the extruder of the present invention has bulk density higher than that of the dry powder and thus may prevent the caking phenomenon from occurring when stored for a long period of time.

As described above, the extruder of the present invention may be more effective to obtain the thermoplastic resin, the diene-based graft copolymer as a specific example, and the acrylonitrile butadiene styrene graft copolymer as a further specific example.

Although the present invention is described by specific embodiments and drawings, the present invention is not limited thereto, and various changes and modifications may be made by a person skilled in the art to which the present invention pertains within the technical idea of the present invention and equivalent scope of the appended claims.

DESCRIPTION OF THE SYMBOLS

10: barrel
20: hopper
30: screw
40: vent part
50: sub-vent part
60: heater part

The invention claimed is:

1. A single-screw extruder configured to extrude a solid raw material containing moisture, the extruder comprising:
   a barrel having a hollow tubular shape in a longitudinal direction, wherein a hopper into which a raw material is put is coupled to one side of the barrel, and a discharge port through which a dehydrated raw material is discharged is provided on the other side of the barrel;
   a rod-shaped screw provided with screw threads on an outer circumferential surface thereof so that the screw is mounted within the barrel to transfer a raw material put into the hopper to the discharge port while axially rotating in one direction;
   a vent part disposed at one point between the hopper and the discharge port to discharge vapor generated within the barrel to the outside; and
   a heater part mounted on the barrel to heat the raw material, wherein the raw material introduced into the barrel through the hopper is gradually heated by the heater part while being transferred within the barrel through the screw,
   a kneading zone, in which raw materials transferred by the screw threads are compressed, is formed on the screw, and
   since the raw material is melted within the barrel so that at least a portion of the raw material is phase-changed into a liquid state, a heating temperature of the heater part and an axial rotation speed of the screw are controlled so that a sealing membrane that shields an inner transverse section of the barrel is formed from the phase-changed raw material in the kneading zone, wherein the kneading zone is disposed between the vent part and the hopper, and wherein the screw comprises:

a first forward zone in which the screw threads are provided to transfer the raw material, which is put from the hopper, toward the discharge port when rotating axially;

the kneading zone in which the screw threads are provided to compress the raw material, which is transferred from the first forward zone, when rotating axially;

a second forward zone in which the screw threads are provided to transfer the raw material, which passes through the kneading zone, toward the discharge port when rotating axially; and a sub-kneading zone in which the screw threads are provided to recompress the raw material, which is transferred from the second forward zone, when rotating axially, and wherein a distance between the sub-kneading zone and the vent part is greater than three times a diameter of the barrel.

2. The extruder of claim 1, wherein a distance between the kneading zone and the vent part is less than three times a diameter of the barrel.

3. The extruder of claim 1, wherein a distance between the kneading zone and the hopper is greater than five times a diameter of the barrel.

4. The extruder of claim 1, wherein the kneading zone comprises a neutral zone in which the screw threads are provided on the outer circumferential surface of the rod shape to induce the raw material to rotate at the same place.

5. The extruder of claim 1, wherein the kneading zone comprises a reverse zone in which the screw threads are provided on the outer circumferential surface of the rod shape to transfer the raw material in a direction opposite to the direction in which the raw material is transferred by the screw threads provided in the first forward zone.

6. The extruder of claim 1, wherein the kneading zone is constituted by connecting the neutral zone, in which the screw threads are provided on the outer circumferential surface of the rod shape to induce the raw material to rotate at the same place, to the reverse zone, in which the screw threads are provided on the outer circumferential surface of the rod shape to transfer the raw material in the direction opposite to the direction in which the raw material is transferred by the screw threads provided in the first forward zone, wherein the neutral zone is connected to the first forward zone, and the reverse zone is connected to the second forward zone.

7. The extruder of claim 1, wherein the screw further comprises a third forward zone in which the screw threads are provided to transfer the raw material, which passes through the sub-kneading zone, toward the discharge port when rotating axially, and a sub-vent part configured to discharge impurities contained in the raw material to the outside is provided in the barrel within a range in which the third forward zone is formed.

8. The extruder of claim 7, wherein a distance between the sub-kneading zone and the sub-vent part is less than three times a diameter of the barrel.

9. The extruder of claim 1, further comprising a pulverizer configured to pulverize the raw material discharged from the discharge port of the barrel.

* * * * *